(12) United States Patent
Limbacher

(10) Patent No.: US 7,878,573 B2
(45) Date of Patent: Feb. 1, 2011

(54) QUICK CHANGE TARPAULIN FOR RETRACTABLE TARPAULIN SYSTEM

(76) Inventor: David F. Limbacher, 55502 Twp Rd 87, Fresno, OH (US) 43824

(*) Notice: Subject to any disclaimer, the term of this patent is extended or adjusted under 35 U.S.C. 154(b) by 412 days.

(21) Appl. No.: 11/952,336

(22) Filed: Dec. 7, 2007

(65) Prior Publication Data

US 2008/0136213 A1    Jun. 12, 2008

Related U.S. Application Data

(60) Provisional application No. 60/873,695, filed on Dec. 8, 2006.

(51) Int. Cl.
    *B60P 7/04* (2006.01)
(52) U.S. Cl. .............................. 296/100.18; 296/100.01
(58) Field of Classification Search ............ 296/100.01, 296/100.17, 100.18
    See application file for complete search history.

(56) References Cited

U.S. PATENT DOCUMENTS

| 4,189,178 | A | * | 2/1980 | Cramaro | 296/105 |
| 5,007,672 | A | * | 4/1991 | Koch | 296/100.18 |
| 5,026,109 | A | * | 6/1991 | Merlot, Jr. | 296/105 |
| 5,253,914 | A | * | 10/1993 | Biancale | 296/100.13 |
| 5,713,712 | A | * | 2/1998 | McIntyre | 414/328 |
| 6,007,134 | A | * | 12/1999 | Weston | 296/83 |
| 6,481,779 | B1 | * | 11/2002 | Gothier et al. | 296/100.13 |
| 6,582,007 | B2 | * | 6/2003 | Gothier et al. | 296/100.11 |
| 2006/0113817 | A1 | * | 6/2006 | Gasper | 296/77.1 |
| 2006/0125278 | A1 | * | 6/2006 | Merlot et al. | 296/100.11 |

* cited by examiner

*Primary Examiner*—Patricia L Engle
*Assistant Examiner*—SunSurraye Westbrook
(74) *Attorney, Agent, or Firm*—Zollinger & Burleson Ltd.

(57) ABSTRACT

A tarpaulin structure for covering a cargo space and used in combination with a support and retraction system includes a body and an openable sleeve for a plurality of the cross supports of the system. Connectors hold the sleeves closed about the cross supports. The tarpaulin system may be installed onto and removed from the cross supports of a tarpaulin support and retraction system without requiring the user to disconnect the cross supports from the drive cables.

18 Claims, 4 Drawing Sheets

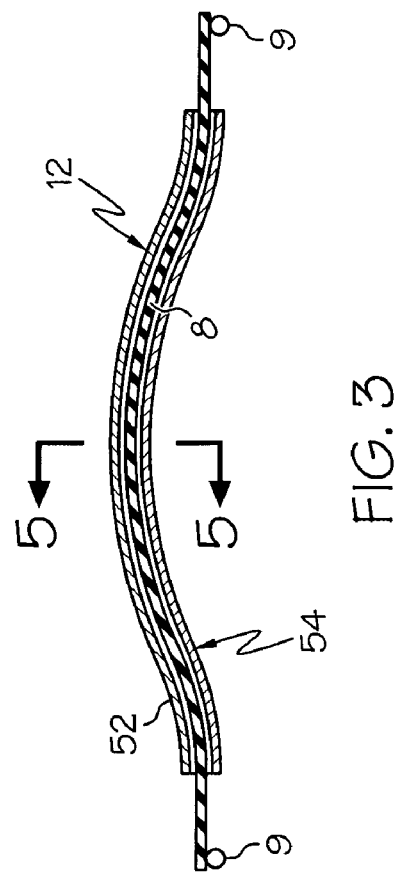
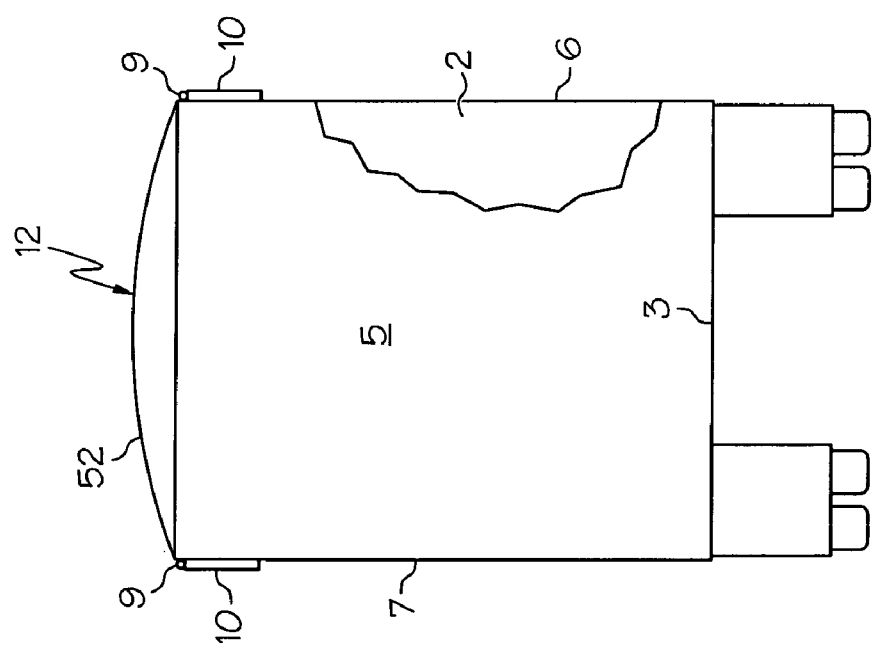

QUICK CHANGE TARPAULIN FOR RETRACTABLE TARPAULIN SYSTEM

CROSS REFERENCE TO RELATED APPLICATIONS

This application claims the benefit of U.S. Provisional Patent Application Ser. No. 60/873,695 filed Dec. 8, 2006; the disclosures of which are incorporated herein by reference.

BACKGROUND OF THE INVENTION

1. Technical Field

The present invention generally relates to retractable tarpaulin systems for truck cargo spaces. More particularly, the present invention relates to a tarpaulin structure for a retractable system, the combination of a tarpaulin and a system, and a method for using the tarpaulin structure that includes the steps of installing the new tarpaulin without removing the cross supports from the cables of an existing system.

2. Background Information

Numerous retractable tarpaulin systems for truck cargo spaces are known in the art. A typical system is used with a truck 1 having a cargo space 2 defined by a bed 3, a front wall 4, a back wall 5 disposed substantially parallel to the front wall and a pair of spaced parallel side walls 6 and 7 disposed substantially perpendicular to the front 4 and back 5 walls. A typical retraction system generally includes a plurality of cross supports 8 positioned across cargo space 2 and supported by side walls 6 and 7. Cross supports 8 are typically disposed substantially parallel to front and back walls 4 and 5. The ends of cross supports 8 engage cables 9 that are strung between pulleys 10. In one typically system, the rearmost cross support moves the cables while the intermediate cross supports slidingly engage the cables. A reversible motor (or hand crank) 11 is used to drive cables 9—and thus the rearmost cross support 8—back and forth across cargo space 2 between extended and retracted positions. As the rearmost cross support 8 moves, the tarpaulin is pulled or pushed across the cargo space. When the rearmost support pulls the tarpaulin, the tarpaulin pulls the remaining cross supports 8. When the rearmost support pushes the tarpaulin, the rearmost support pushes the other cross supports which moves the tarpaulin with them.

A tarpaulin is connected to cross supports 8 and is retractable and extendable along with cross supports 8. The tarpaulin defines a closed sleeve that surrounds each cross support 8. A drawback with this arrangement is that each cross support 8 must be pushed through a sleeve (or each sleeve must be shimmied over its cross support) to connect the tarpaulin to cross supports 8. This process is especially annoying in cold or wet weather. The process requires the person installing the tarpaulin to disconnect at least one end of cross supports 8 from cable 9. This process is undesirable and time consuming. The art thus desires a system that allows the entire tarpaulin to be installed without disassembling the elements of the retraction system.

U.S. Pat. No. 5,026,109 discloses a segmented cover system that allows damaged sections of a tarp to be replaced without replacing the entire tarp. These individual tarp sections may be removed and installed by sliding the edge of the tarp section through a slot defined by the cross support. The system requires special cross supports that include removable ends (58) that cap the cross supports. This system requires the ends to be removed before the tarp sections are installed or removed. Further, the system requires existing cross supports to be replaced with specialized cross supports that are capable of receiving the tarpaulin sections. Although this system solves the problem of replacing an entire tarpaulin when only a small section is damaged or worn, the system does not solve the problem of replacing entire tarpaulins on existing support systems.

BRIEF SUMMARY OF THE INVENTION

The invention provides a tarpaulin structure that may be installed onto and removed from the cross supports of a tarpaulin support and retraction system without requiring the user to disconnect the cross supports from the drive cables. In one configuration, the tarpaulin includes an openable attachment sleeve for each cross support so that the attachment sleeve may be opened, wrapped around a cross support, and then closed to connect the tarpaulin to the cross support. In one configuration, the attachment sleeves are elongated and opened and closed with connectors disposed along the length of the sleeve. In another configuration, each sleeve is made up of a plurality of spaced attachment sleeve sections that cooperate together to define the sleeve. The connectors may be in the form of zippers, hook and loop fasteners, a plurality of snap connectors, a plurality of ratcheting or one-way ties, a strong releasable adhesive, or nut-bolt combinations.

In another configuration, the invention provides a tarpaulin structure in combination with a tarpaulin support and retraction system. This combination provides a tarpaulin having an openable attachment sleeve disposed around at least a portion of each cross support so that the attachment sleeve may be opened, wrapped around a cross support, and then closed to connect the tarpaulin to the cross support. In one configuration, the attachment sleeves are elongated and opened and closed with connectors disposed along the length of the sleeve. In another configuration, each sleeve is made up of a plurality of spaced attachment sleeve sections that cooperate together to define the sleeve. The connectors may be in the form of zippers, hook and loop fasteners, a plurality of snap connectors, a plurality of ratcheting or one-way ties, a strong releasable adhesive, or nut-bolt combinations.

The invention also provides a method for installing a tarpaulin on a retractable tarpaulin system wherein the sleeves of the tarpaulin are wrapped around the cross supports of the retraction system. The wrapping of the sleeves around the supports allows the tarpaulin to be installed on the system without disconnecting the cross supports of the system. In one configuration, the method includes the step of moving all of the supports to the front of the cargo area. The tarpaulin is placed over the supports and its front edge secured. The rearmost sleeve is then connected to the rearmost cross support by pulling the sides of the open sleeve over the sides of support and connecting the sides together underneath the rearmost support with its connector. The rearmost support then may be moved back a few feet by the cable system to pull the tarpaulin open until the next sleeve is roughly aligned with the next support. The process is repeated until all of the sleeves are connected to the cross supports to place the tarpaulin over the cargo area. This method allows the tarpaulin to be installed without disconnecting the cross supports from cables.

BRIEF DESCRIPTION OF THE SEVERAL VIEWS OF THE DRAWINGS

FIG. 2 is an end view of the truck taken along line 2-2 of FIG. 1.

FIG. 3 is a section view taken through one of the tarpaulin support cross supports showing one of the sleeves of the tarpaulins of the invention.

Similar numbers refer to similar parts throughout the specification.

DETAILED DESCRIPTION OF THE INVENTION

Figure 1:
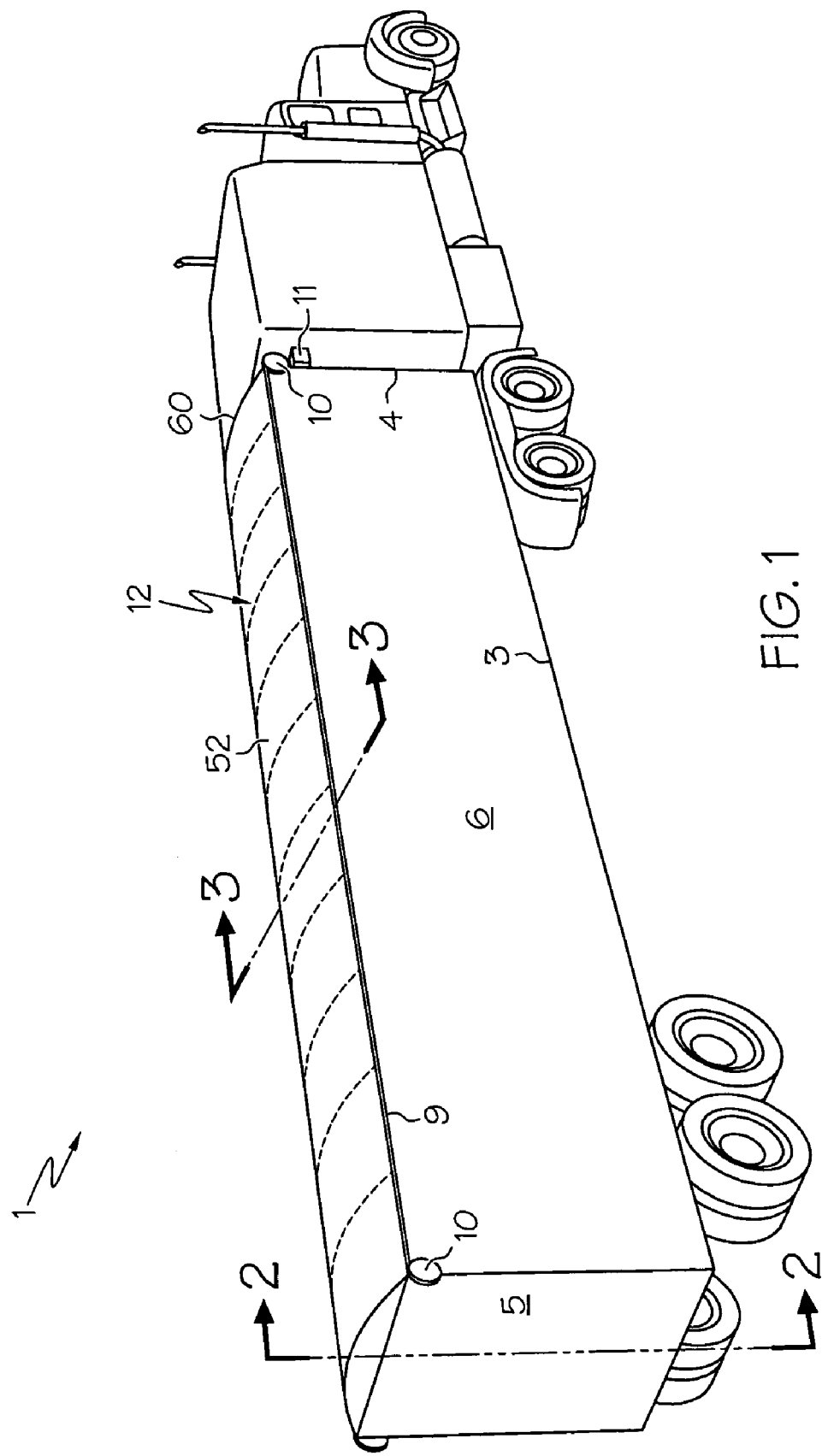
FIG. 1 is a perspective view of a truck using the tarpaulin system of the invention.

A tarpaulin made in accordance with the concepts of the invention is indicated generally by the numeral 12 in the accompanying drawings. Tarpaulin 12 includes a body 52 and a plurality of parallel, openable and closeable sleeves 54. Body 52 is sized and configured to substantially cover a cargo area such as cargo space 2 in the exemplary vehicle 1 of FIGS. 1 and 2. Cargo space 2 may be configured to receive and hold a wide variety of different items or materials. As such, body 52 may be fabricated from variety of materials that match the need of the cargo carried by vehicle 1.

Each sleeve 54 defines a longitudinal slit 56 that allows sleeve 54 to be opened from a closed configuration to an open configuration along the entire length of sleeve 54. A connector 58 or a plurality of connectors 58 are used to maintain sleeve 54 in the closed configuration. In the exemplary embodiment of the invention, connector 58 is a zipper. Other connectors such as strips of hook and loop connectors, a plurality of snap connectors, a plurality of wire or zip ties, releasable adhesive, or nut-bolt combinations may be used to hold the edges of sleeve closed. Each type of connector 58 has a fastened condition and an unfastened condition.

Sleeves 54 are used to connect tarpaulin 50 to cross supports 8. In order to install tarpaulin 50 on a retraction system, the old tarpaulin is removed leaving the cross supports in place. This may be achieved by cutting the old tarpaulin away from the system. In one exemplary method of installing the tarpaulin, supports 8 are moved toward the front of cargo space 2. Tarpaulin 50 is placed over supports 8 and with its front edge aligned with the front of the cargo area 2. The front edge of tarpaulin 50 is connected to the retraction system or to vehicle 1 in the typical manner—which may be by clamping the front edge of tarpaulin 50 under a leading clamp bar 60 of the system. The rearmost sleeve is then connected to the rearmost cross support by pulling the sides of the open sleeve over the sides of support 8 and connecting the sides together underneath support 8 with connectors 58. When connector 58 is a zipper, the person installing tarpaulin 12 simply aligns the ends of the zipper and pulls the zipper tab across the cargo bed to close the sleeve around the cross member. The zippers are thus disposed under the body 52 facing the cargo area of the vehicle. Sleeve 54 or connector 58 may be provided with a lock that helps to secure connector 58 in the closed position. Such a lock may be a key or combination lock, a hook or tie to hold the zipper pull in position, an adhesive to lock the connection, or other type of connector locks known in the art. After the rearmost sleeve is connected to the rearmost support, the rearmost support is moved back a few feet to provide space for the next support. The user then connects a sleeve to the next cross support. Once this connection is made, the user moves the rearmost cross support back farther still thus pulling the newly connected cross support along with the rearmost cross support by tarpaulin 50. The process is repeated until all of the sleeves are connected to the cross supports to place the tarpaulin over the cargo area. This method allows the tarpaulin to be installed without disconnecting the cross supports from cables.

Figure 4:
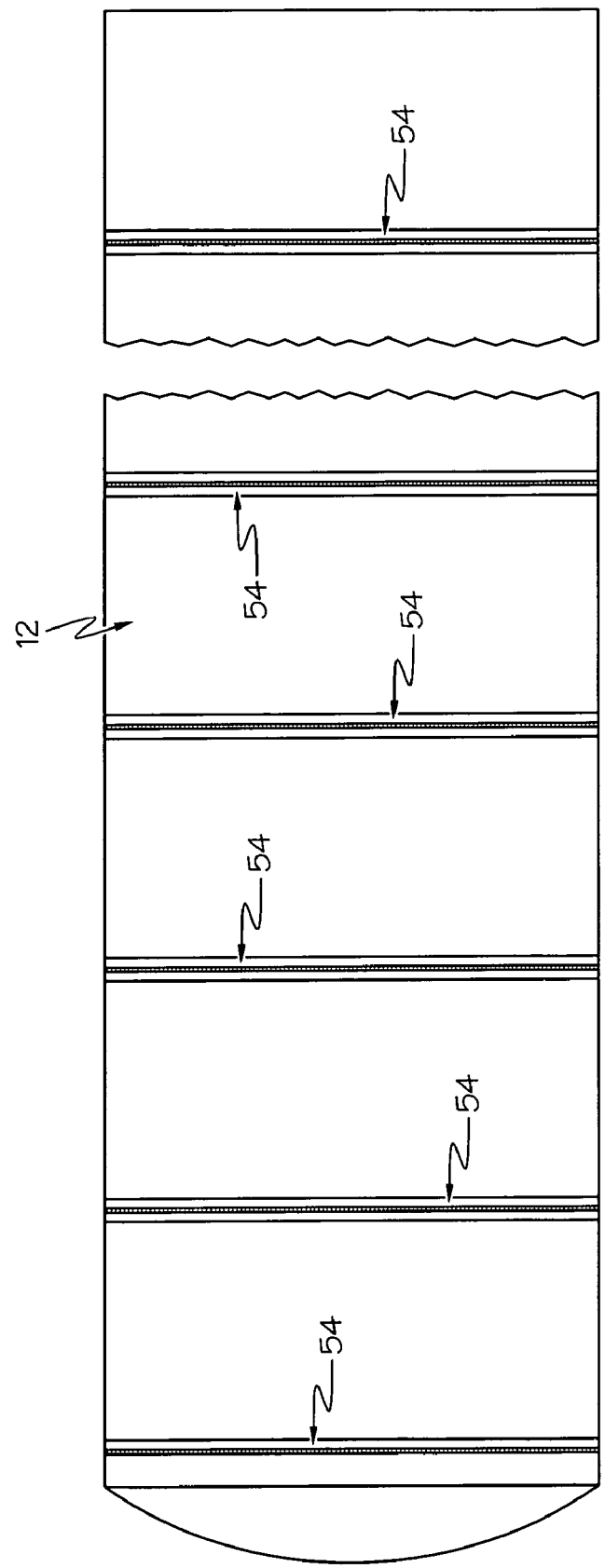
FIG. 4 is a plan view of the bottom of the tarpaulin showing a plurality of attachment sleeves.

The rearmost sleeve 54 (disposed at the left hand side of FIG. 4) is larger than the other sleeves 54 disposed along body 52. The rearmost sleeve is about twice as wide as the others to provide room for adjustments with respect to the rear of the retraction system. A tail flap may also extend down from the end if desired.

Figure 5A:
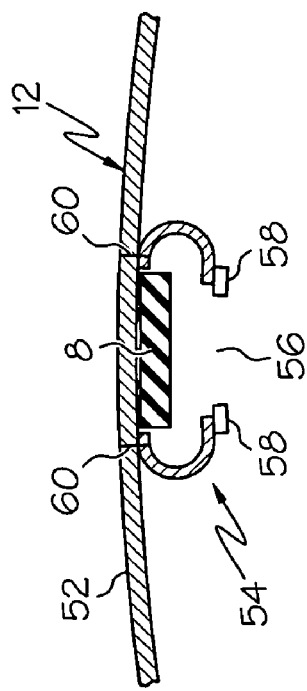
FIGS. 5A-C are exemplary cross sections taken along line 5-5 of FIG. 3 showing the section of different sleeve configurations which are disposed around a cross support with the connectors disconnected to open the slit of the sleeve.
Figure 5B:
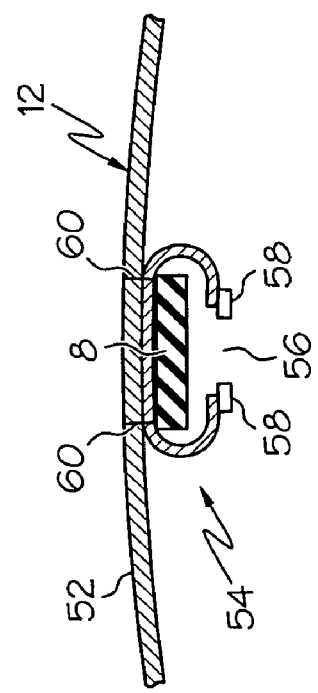
Figure 5C:
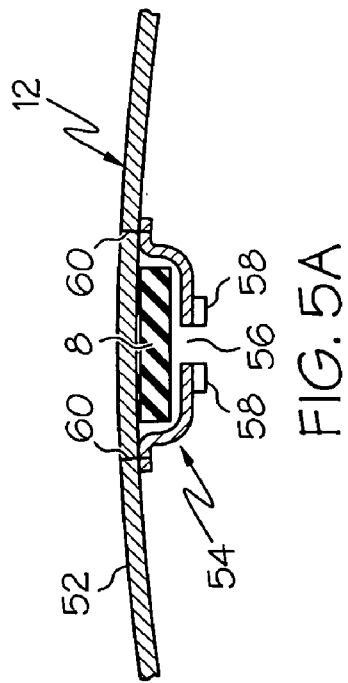

Each sleeve 54 may be formed by connecting two independent sections of material to body 52 as depicted in FIG. 5A or 5B with a fastener 60. Fastener 60 may be a plurality of stitches, and adhesive, a weld, a plurality of mechanical connectors (such as staples), or other such fasteners. Sleeves 54 may also be formed by connecting a single section of material in the form of a tube to body 52 so that the material is doubled up directly above cross supports 8 when tarpaulin 12 is in use (a portion of the sleeve material is disposed between cross support 8 and body 52). This configuration strengths tarpaulin 12 and prevents wear at the junctions between the cross supports 8 and body 52.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A tarpaulin for a retractable tarpaulin system on a cargo trailer, the system having a plurality of cross supports that support the tarpaulin; the tarpaulin comprising:
   a flexible body adapted to substantially fit over the cargo area of the trailer and be supported by the cross supports;
   a plurality of openable and closable sleeves defined by the body; each of the sleeves having a longitudinal direction; each of the sleeves defining an opening when the sleeve is in an open configuration; the opening extending entirely across the longitudinal direction of the sleeve;
   each of the sleeves being fabricated from a flexible material; and
   a connector associated with each sleeve; the connector having fastened and unfastened conditions; the fastened condition adapted to maintain the sleeve in the closed configuration.

2. The tarpaulin of claim 1, wherein the connector is a zipper.

3. The tarpaulin of claim 2, wherein the body has a width; each of the sleeves having a length substantially the same as the width of the body; and the zipper extending substantially the entire length of the sleeve.

4. The tarpaulin of claim 2, wherein each sleeve is formed from at least a pair of flexible material sections.

5. The tarpaulin of claim 2, wherein each sleeve is formed from a tube of flexible material.

6. The tarpaulin of claim 1, wherein the connectors are one of strips of hook and loop connectors, a plurality of snap connectors, a plurality of wire or zip ties, releasable adhesive, and nut-bolt combinations.

7. The tarpaulin of claim 1, wherein the body includes a rearmost sleeve having a width that is wider than the other sleeves.

8. A tarpaulin support and retraction system for use on a vehicle having a cargo space; the system comprising:
   a retraction device having a pair of retraction cables;

a plurality of cross supports adapted to be disposed across the cargo space of the vehicle;

each of the cross supports having a first end and a second end; the first and second ends engaging the retraction cables;

a tarpaulin having a plurality of openable and closeable sleeves;

the tarpaulin disposed over the cross supports;

a plurality of the cross supports disposed in the sleeves; and a connector associated with each sleeve; the connector having fastened and unfastened conditions; the fastened condition adapted to maintain the sleeve in the closed configuration around the cross support.

9. The tarpaulin support and retraction system of claim 8, wherein the each of the connectors is a zipper.

10. The tarpaulin support and retraction system of claim 9, wherein the ends of the cross supports extend from the sleeves.

11. The tarpaulin support and retraction system of claim 8, wherein each sleeve is formed from at least a pair of material sections.

12. The tarpaulin support and retraction system of claim 8, wherein each sleeve is formed from a tube of material.

13. The tarpaulin support and retraction system of claim 8, wherein the connectors are one of strips of hook and loop connectors, a plurality of snap connectors, a plurality of wire or zip ties, releasable adhesive, and nut-bolt combinations.

14. The tarpaulin support and retraction system of claim 8, wherein the body includes a rear sleeve having a width that is wider than the other sleeves.

15. A method for installing a tarpaulin on a retractable tarpaulin system over a cargo space having a front and a rear; the retractable tarpaulin system having a plurality of cross supports that engage a retraction system; the cross supports including a rearmost cross support and a plurality of intermediate cross supports; the cross supports being movable by the retraction system between extended and retracted conditions; the method comprising the steps of:

(a) moving the cross supports to a retracted condition;

(b) providing a tarpaulin having a plurality of openable and closeable sleeves; one of the sleeves being the rearmost sleeve and a plurality of the sleeves being intermediate sleeves;

(c) connecting the rearmost sleeve to the rearmost cross support;

(d) moving at least the rearmost cross support having the connected rearmost sleeve to an position rearward of the retracted position;

(e) connecting one of the intermediate sleeves to an intermediate cross support; and (f) repeating steps (d) and (e) until the rearmost cross support is disposed adjacent the rear of the cargo space.

16. The method of claim 15, further comprising the step of wrapping each sleeve around its cross support to connect the sleeve to the cross support.

17. The method of claim 15, wherein each of the sleeves has a connector used to hold the sleeve closed about the cross support and further comprising the step of closing the connector from inside the cargo space beneath the tarpaulin.

18. The method of claim 15, further comprising the step of connecting the sleeves to the cross supports without disengaging the cross supports from the retraction device.

* * * * *